UNITED STATES PATENT OFFICE.

WILHELM GRUETTEFIEN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING AMINOACETYLPYROCATECHIN.

970,217.        Specification of Letters Patent.       Patented Sept. 13, 1910.

No Drawing. Original application filed March 9, 1909, Serial No. 482,392. Divided and this application filed July 22, 1909. Serial No. 508,986.

*To all whom it may concern:*

Be it known that I, WILHELM GRUETTEFIEN, doctor of philosophy, chemist, citizen of the German Empire, residing at Vohwinkel, near Elberfeld, Germany, have invented new and useful Improvements in New Processes of Producing Aminoacetylpyrocatechin, of which the following is a specification.

This application which is a divisional application of my application Serial No. 482,392 dated March 9, 1909 relates to a new and valuable process for producing the known aminoacetylpyrocatechin.

I have found that ethers of n-phthaliminoacetylpyrocatechins having the formula:

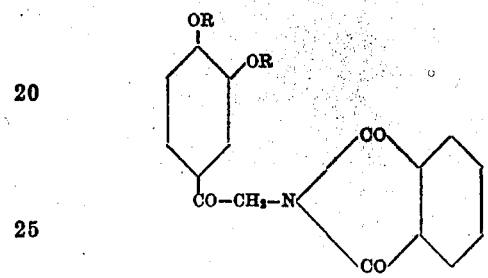

(R meaning alkyl) can be obtained by treating dialkyl ethers of pyrocatechin with phthalylglycyl chlorid (see *Berichte der Deutschen Chemischen Gesellschaft* 40, page 2649) in the presence of aluminum chlorid. The new compounds thus obtained yield by saponification the known aminoacetylpyrocatechin:

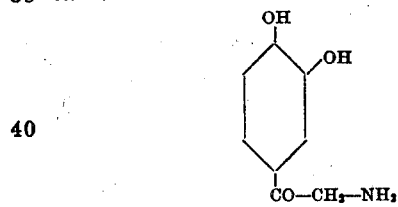

which has the valuable therapeutic property of increasing the blood-pressure in the same way as the substance contained in the suprarenal glands. My discovery affords a new and very useful way of producing this valuable compound which is employed in doses of 1/50 mgr. dissolved in water, for subcutaneous injections.

The above reactions take probably place according to the following formulæ:

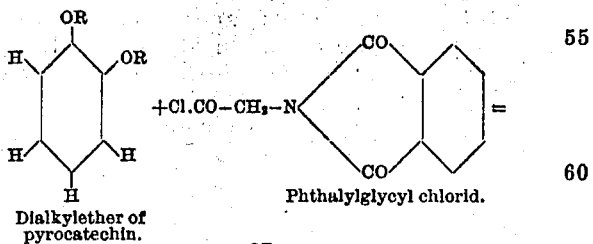

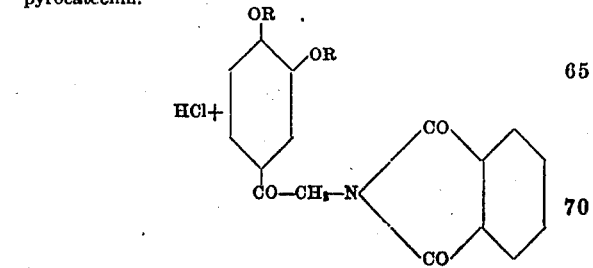

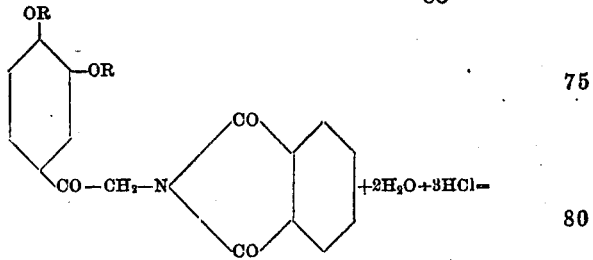

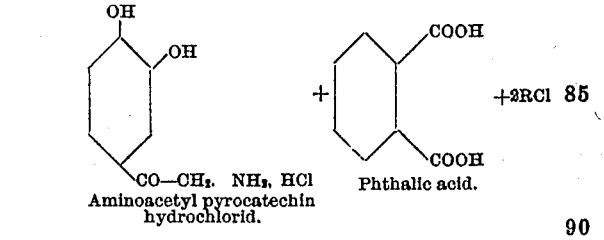

Example: 40 parts by weight of finely powdered aluminum chlorid are added to a mixture of 40 parts of phthalylglycyl chlorid and 40 parts by weight of veratrol (dimethyl ether of pyrocatechin). It is heated for half an hour on the water bath until the evolution of HCl ceases. The melt is carefully mixed with ice and 50 parts by weight of hydrochloric acid containing 20% HCl, warmed on the water-bath and unchanged veratrol is removed by distillation with steam and the residue is then extracted with hot alcohol. The n-phthaliminoacetoveratrol remains undissolved as a white powder which is collected on a filter. The new product melts at 202° C.

The process is carried out in an analogous manner for the preparation of other n-phthaliminoacetylpyrocatechin ethers e. g. the diethyl ether, etc.

5 parts by weight of phthaliminoacetoveratrol are heated in an autoclave with 20 parts of glacial acetic acid and 15 parts by weight of pure concentrated hydrochloric acid for one hour at 150° C. Methyl chlorid and phthalic acid are split off during the reaction. After cooling the product of the reaction is diluted with water, insoluble matters are removed by filtration, the filtrate is extracted with ether and from the acid watery solution the aminoacetopyrocatechin is precipitated by the addition of ammonia.

I claim:—

1. The process for producing aminoacetylpyrocatechin, which process consists in first reacting upon dialkyl ethers of pyrocatechin with phthalylglycyl chlorid in the presence of aluminum chlorid and then saponifying the products thus produced, substantially as described.

2. The process for producing aminoacetylpyrocatechin which process consists in first reacting upon veratrol with phthalylglycyl chlorid in the presence of aluminum chlorid and then saponifying the product thus produced, substantially as described.

3. The process for producing aminoacetylpyrocatechin which process consists in first reacting upon dialkyl ethers of pyrocatechin with phthalylglycyl chlorid in the presence of aluminum chlorid and then saponifying the products thus produced with acids, and isolating the free base by means of alkali substantially as described.

4. The process for producing aminoacetylpyrocatechin which process consists in first reacting upon veratrol with phthalylglycyl chlorid in the presence of aluminum chlorid and then saponifying the product thus produced with acids, and isolating the free base by means of alkali substantially as described.

In testimony whereof I have hereunto set my hand in the presence of two subscribing witnesses.

WILHELM GRUETTEFIEN. [L. S.]

Witnesses:
  OTTO KÖNIG,
  WILLY KLEIN.